(12) United States Patent
Freeman

(10) Patent No.: US 6,456,746 B2
(45) Date of Patent: Sep. 24, 2002

(54) METHOD OF MEMORY UTILIZATION IN A PREDICTIVE VIDEO DECODER

(75) Inventor: Smith Freeman, Skillman, NJ (US)

(73) Assignees: Sarnoff Corporation, Princeton, NJ (US); Motorola Inc., Schaumburg, IL (US)

( * ) Notice: Subject to any disclaimer, the term of this patent is extended or adjusted under 35 U.S.C. 154(b) by 0 days.

(21) Appl. No.: 09/382,934

(22) Filed: Aug. 25, 1999

Related U.S. Application Data
(60) Provisional application No. 60/117,191, filed on Jan. 26, 1999.

(51) Int. Cl.[7] ............................. G06K 9/54; G06K 9/60
(52) U.S. Cl. ............................................. 382/305
(58) Field of Search ........................ 382/233, 232, 382/305; 348/716; 375/240.26, 240.24, 240.28, 240, 240.27–240.29; 345/530, 541, 571, 555, 560

(56) References Cited

U.S. PATENT DOCUMENTS

| 5,754,234 A | * | 5/1998 | KitsuKi et al. | ........ | 375/240.24 |
| 5,850,483 A | | 12/1998 | Takabatake et al. | | |

FOREIGN PATENT DOCUMENTS

| JP | 11167518 | 6/1999 |
| WO | WO 97/39437 | 10/1997 |

OTHER PUBLICATIONS

International Search Report for PCT/US00/01680, filed Jan. 26, 2000.

Winzker, M et al., Architecture and Memory Requirements for stand–alone and hierachial MPEG2 HDTV–Decoders with Synchronous DRAMs, International Symposium on Circuits and Systems (ISCAS), US, New York, 1995, pp. 609–612.

\* cited by examiner

*Primary Examiner*—Timothy M. Johnson
(74) *Attorney, Agent, or Firm*—William J. Burke

(57) ABSTRACT

Method of storing pixel data in a memory of a predictive video decoder that stores pixel data in words that contain blocks of pixel information. Each word or a sequence of words contains pixel data from a rectangular block of pixels, e.g., a 2×2 pixel block is stored in a 4 byte word or a 2×4 pixel block is stored in two successive 4 byte words. These words are stored in memory pages where a page or successive pages contain a series of words of data representing a row of pixel blocks. Consequently, the words representing groups (blocks) of pixels are stored from left to right in the order that the pixels appear in the frame. A pair of memory banks is used to store the words and each successive row of pixel blocks is stored in a different one of the two memory banks.

3 Claims, 2 Drawing Sheets h = HORIZONTAL DISPLAY POSITION IN UNITS OF 2 SAMPLES
v = VERTICAL POSITION IN ROWS OF ELEMENTS (2 x 2 BLOCKS)
s = PAGE ADDRESS (NOT INCLUDING BANK) OF THE FIELD-STORE START (ASSUMED EVEN)
r = PAGE PART OF ADDRESS WORD = s + v

METHOD OF MEMORY UTILIZATION IN A PREDICTIVE VIDEO DECODER

The present application claims benefit of U.S. provisional patent application No. 60/117,191 filed Jan. 26, 1999 and incorporated herein by reference.

The invention relates to video processing systems and, more particularly, the invention relates to a method for reducing the memory bandwidth required in a video decoder.

BACKGROUND OF THE DISCLOSURE

Commercial memory integrated circuits (chips), particularly low-cost, 16 Mbit dynamic random access memory (DRAM) and synchronous dynamic random access memory (SDRAM), are organized into two "banks", each bank typically consisting of 2–4 k pages of 256 words per page. A word might be 8 or 16 bits wide. In the former case there are 4 k pages, and in the latter 2 k pages, so the total number of bits is always 16 M. The chips may be ganged in parallel to increase the effective word width—e.g., to 32-bits for a pair of chips. To illustrate the present state of the art, the case of 2 k pages of 16-bit (or ganged to 32-bits) words is described below.

Reading or writing data to/from such a memory involves opening (activating) a single page in one bank. Once the bank is open, any number of read and write operations to that page can be performed quickly. To access data on a different page of that bank, the first page must be closed, the bank containing the new page precharged and the new page opened. The precharge and activation involves a processing overhead of up to 9 (or even more) computer cycles and is a major factor in limiting the quantity of data that can be accessed in a given time period (i.e., the effective memory bandwidth.)

This overhead can be minimized in various ways—both banks can be used (their operation is essentially independent apart from sharing common communication channels with the accessing device), a bank can be precharged as soon as its use is complete thus preparing it for another access, and the data can be organized in such a way that many words of data are accessed on a single page.

In a video decoder that is compliant with the moving pictures experts group (MPEG) standard, commonly referred to as an MPEG decoder, a stored decoded anchor frame is accessed to predict a first approximation to a macroblock (MB) in a frame that is being decoded. Generally, an MPEG encoder contains an embedded decoder that is used to perform prediction encoding of the video frames. The decoder within an encoder stores decoded anchor frames in the same manner as a stand-alone decoder stores anchor frames.

In writing the anchor frames to memory for use in subsequent decoding operations, large enough quantities of data can be buffered (accumulated in a register bank in the decoding device) to make the memory usage fairly efficient. However, in reading this data to construct the macroblock predictions, the data is typically accessed in small quantities scattered in a random manner throughout the memory. The small size of the data retrieved with each access makes each transaction very inefficient, and the random distribution of the data makes traditional caching strategies ineffective. The result is that reading anchor frame data requires a very large memory bandwidth that makes decoders difficult to implement in a cost-efficient manner.

To be more specific about this storage problem: the memory is commonly addressed in a linear manner. That is, the data words are regarded as a sequence in order of increasing address with the column address (identifying the word on a page), bank index, and page address being treated as the successively more significant parts of the overall address. The rectangular array of pixels constituting the luma or chroma information of a frame or field of video is then written into memory in a raster scan fashion. That is, pixels are sequenced and written into memory in a sequenced order with the scanning being left to right horizontally along each row with the rows taken in succession top to bottom. Several pixels are typically written into a single data word; for example if a data word is 32-bits wide and the pixels are one byte each, four pixels are packed into each word. (Position of a pixel in the data word is effectively the least significant part of the pixel address.)

The video data is decoded on a macroblock by macroblock basis—for present purposes to be regarded simply as a rectangular array of pixels. Because the decoding proceeds in a raster scan order on a macroblock basis, it is possible to accumulate several macroblocks adjacent along a horizontal row before writing the decoded data to the memory. The data for each horizontal row of the array can be efficiently written since the storage method can make certain that the data is all on a single page. Successive rows may require a page change, with or without a bank change as well. The frequency of such changes can be minimized by accumulating several macroblocks if necessary. Furthermore, writing this data is regular and can be aligned on data word boundaries, which increases the access efficiency.

In reading the macroblock data for motion compensated prediction, however, the data is not aligned. As such, the desired rectangular array of data that is required to decode a predicted frame may begin and end in the middle of the group of pixels packed into a word. Consequently, the extra words must be read in order to extract the desired data. Furthermore, the rectangular array of pixels needed for prediction may be broken into subarrays—by field, for example—which further tends to convert a few large memory transactions into many small ones. Consequently, the process used to read macroblock data is very inefficient.

Therefore, a need exists in the art for a method of storing pixel data to facilitate efficient memory utilization and reduce the memory bandwidth required in a predictive video decoder.

SUMMARY OF THE INVENTION

The disadvantages of the prior art are overcome by the invention of a method of storing pixel data in a memory of a predictive video decoder or such a decoder that is embedded in a predictive video encoder. The method stores pixel data from spatial blocks of pixels in each data word. For example, each data word contains pixel data from a rectangular block of pixels (RBP), e.g., a 2×2 pixel block is stored in a 4 byte data word. These data words for a horizontal row of RBP's are stored on a succession of pages from the same memory bank. Any left over word storage space on the last such page is used for other purposes other than storing video data. As such, a row of RBP's does not overlap from one page to another. The next lower row of RBP's is stored in a similar sequence beginning with a new page in the other memory bank.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method of organizing the storage of video data in memory that makes data access much more efficient and reduces the memory bandwidth required for that access. The two key features of the invention are 1) to store into a single data word or group of data words data that represents a small rectangular block of pixels, and 2) to store successive rows of pixel data always starting at the beginning of a page and with the bank switch operations always treated as the least significant bit of a vertical address.

Figure 1:
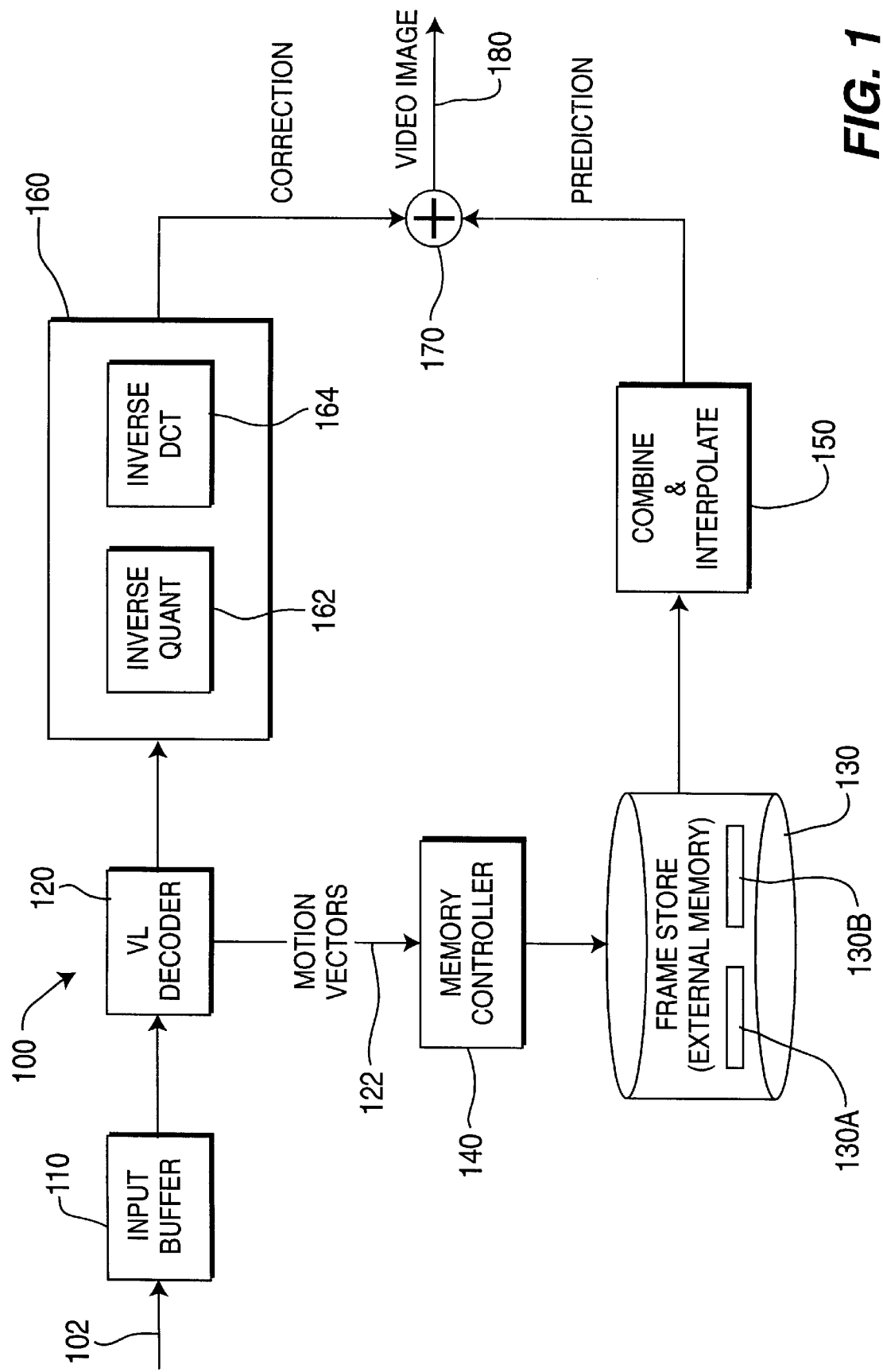
FIG. 1 depicts block diagram of a video decoder.

FIG. 1 depicts a block diagram a predictive video decoding system 100 (specifically, an MPEG decoder) incorporating the present invention. The input signal, at port 102, to the system is an MPEG compliant bitstream. The video decoder 100 comprises an input buffer 110, a variable length code (VLC) decoder section 120, an image data decoding section 160, frame memory 130 and combine and interpolate section 150. The video decoder 100 accepts the encoded video bitstream and decodes the various data elements that are used to produce a decoded video output 180.

Specifically, the encoded video bitstream is received and accumulated into the input buffer 110 until it is needed. The VLC decoder section 120 decodes the picture type and all other information via a plurality of variable length code tables that are disclosed in ISO/IEC international Standards 13818-2. The decoded information allows for the proper selection of a particular motion compensation or intra coding process depending upon the picture type of a decoded picture, i.e., whether the picture is an I-, B- or P-frame.

For each macroblock of the MPEG pictures, the VLC decoder section 120 also decodes the motion vectors 122, if any, giving the displacement from the stored previous and/or future pictures. The previous and future reference pictures are stored in the frame memory 130. Memory management is provided by memory controller 140. The inventive storage method as implemented by the memory controller 140 is discussed in detail below. Within the combine and interpolate section 150, the motion vectors 122 are used to produce predicted macroblocks of pixels.

The VLC decoder 120 also decodes the quantized coefficients corresponding to the quantized coefficients of the predictive residual or difference macroblock. The decoded quantized coefficients are forwarded to image data decoding section 160, where the inverse quantization and inverse discrete cosine transform are applied to the quantized coefficients by an inverse quantizer section 162 and an inverse DCT section 164, respectively. The quantized coefficients are converted into pixel values which are added to a predicted block, if any, to produce the decoded picture 180.

Furthermore, the VLC decoder 120 also decodes important header information that may contain a plurality of video syntax or extensions such as the "Picture Coding Extension". This extension and others are defined in ISO/IEC international Standards 13818-2. Each extension may contain "flags" which are generally one bit integer variable that provides information about the coded data. Such information may affect the construction, display, timing and order of the pixel values and predicted macroblocks that are generated by other sections of a video decoder.

The present invention lies in the organization of the data stored in the frame memory 130 having at least two memory banks 130A and 130B. The memory controller 140 manages the inventive storage process.

The pixel data is stored using a data word width of w bytes (w is usually a power of 2). The inventive method stores pixels by rectangular groups or "elements", i.e., rectangular block of pixels (RBP's). In essence, the frame of pixels is "titled" into rows and columns of RBP's. Let such a RBP have a horizontal width of x pixels and a vertical height of y rows, then this RBP is stored into x*y/w successive data words on a page (w must divide the product of x and y). For example, if x=2, y=2 and w=4, the method stores into each data word the pixels in a 2×2 block rather than 4 pixels along a single scan line.

The horizontal width of a row of RBPs does not ordinarily correspond to the number of pixels that can be stored on a page—typically 256*w. One or more pages in a single bank are used to hold the elements following one another along a horizontal row of the display. This will generally end in the middle of a page. The rest of that page will not be used for storing this sort of pixel data. The remaining memory need not be wasted, the memory is simply used for some totally different purpose. The next row of RBP's (below the one previously stored), will use analogously chosen pages in the opposite bank. The bank switch is thus the least significant bit (lsb) of the vertical storage position with the page address being used to generate the more significant part of this vertical address.

Figure 2:
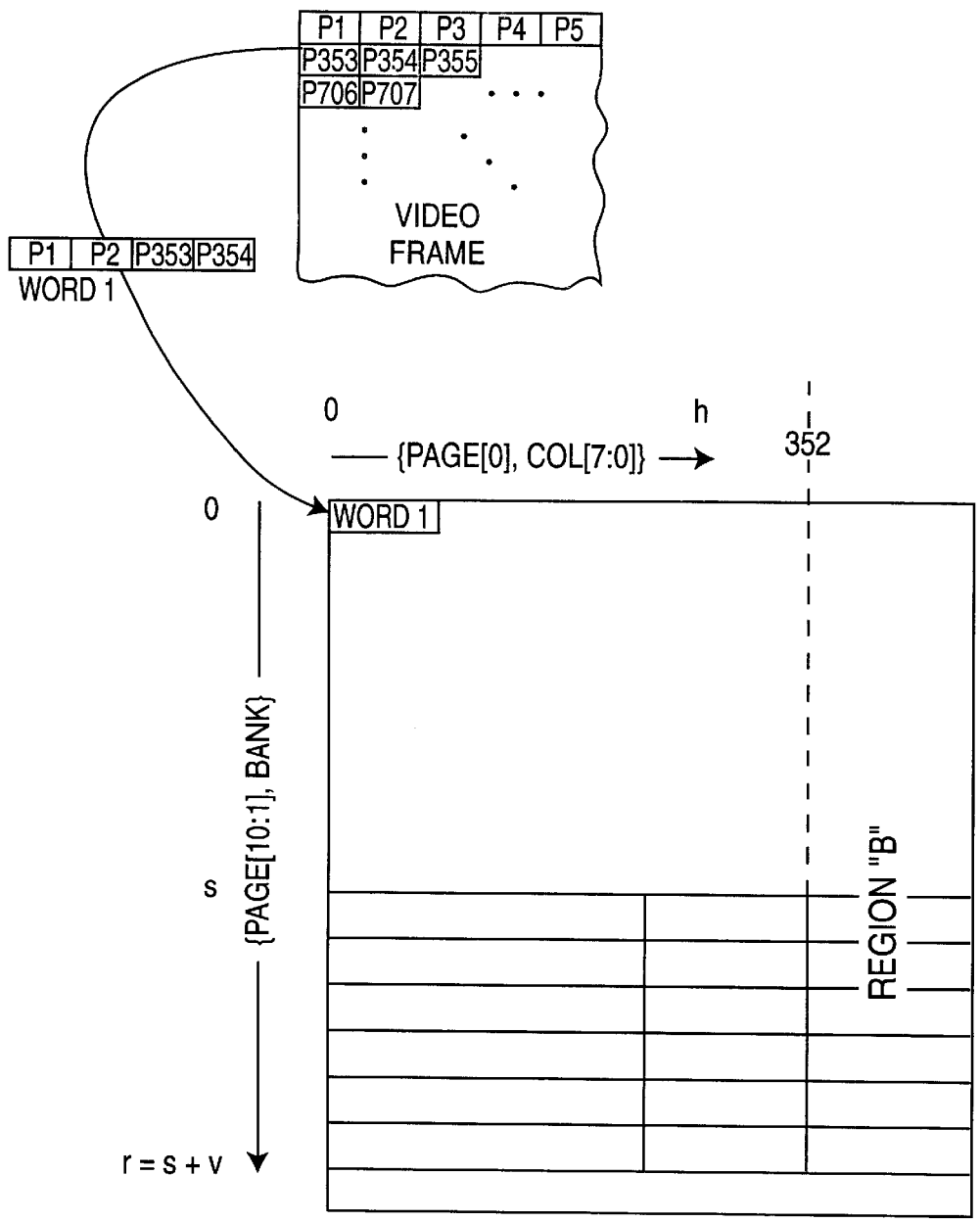
FIG. 2 illustrates a memory page for storing video data within the decoder of FIG. 1 in accordance with the invention.

FIG. 2 illustrates a memory map for an example that stores 2×2 elements of a standard NTSC display (704 pixels wide). In this case, two pages are needed to store each horizontal row of pixels. The left over memory space, called "region B" in FIG. 2 can be used for some other purpose—e.g., VBV buffer, audio data storage, navigational information extracted from the transport layer, on-screen display (OSD) data, and the like.

Using this example, it is possible to illustrate how this technique saves memory bandwidth. The invention increases the number of memory accesses that are performed on the same page associated with reading a horizontal row of elements and guarantees that successive rows are on alternate memory banks. This permits the precharge and activation for each bank to occur during the period when transactions involving the other bank are ongoing. As such, these overhead processes are then said to be "hidden." The price paid for these advantages are the need to have and to make use of the region B storage, the occurrence of transactions that straddle the page change without a bank change in the middle of each row of elements, and the need to read extra data because of the coarser granularity in the vertical storage direction. The first of these is often not a problem and the latter can be shown in many cases to be an acceptable price for the advantages gained.

The benefits of the present invention will be clear from a comparison of the prior art to the present invention. Assuming w=4, the shortest transaction involving one bank that permits the precharge and activation of the other bank to be completely hidden is taken to be 8 (based on examples studied having a read latency of 3 and burst size of 2.) Reading a 16×8 macroblock of pixel data in the traditional memory access technique then involves typically 5 accesses on a page for a horizontal row of pixels followed by a page change for the next row of pixels. In the prior art, where successive pixels are stored in a word, e.g., x=4 and y=1 (i.e., the element is a traditional horizontal segment of pixels on a single line), the total time of the transaction approximates 8 cycles per row times the number of rows or a total of about 64 cycles. In a traditional memory layout, with memory compactly tiled, a fraction of the row changes will not involve a bank change. Each such row-without-bank change will typically add about 5 additional cycles for bank precharge. The number of actual cycles depends, for example, on details of the memory layout whether the storage is field or frame based, the nature of the prediction vector, (field or frame) and the sophistication of the memory controller.

The present invention having, for example, 2×2 RBP's, reading each row requires only 9 cycles, which permits precharge and activation to be hidden, i.e., as data is accessed in one bank, the other bank is precharged. In general, however, 9 rows (one extra) must be read to cover the desired region (e.g., a 16×8 pixel macroblock) because of the vertical granularity. Thus, retrieving a 16×8 macroblock of pixels when using 2×2 pixel blocks in each data word requires about 45 cycles to complete—a clear saving over the 4×1 memory access technique of the prior art.

The transactions that cross the page boundary take about twice as long. If the reference macroblocks are randomly distributed, such page-crossing accesses occur in a fraction 8/(352−8) of the cases. This is about 2.3%. Doubling the transaction for this small fraction of cases does not substantially affect the advantage of the technique with 2×2 elements.

Although various embodiments which incorporate the teachings of the present invention have been shown and described in detail herein, those skilled in the art can readily devise many other varied embodiments that still incorporate these teachings.

What is claimed is:

1. A method of storing video data comprising the steps of:

filing a frame of pixels into a plurality of pixel blocks that are arranged in rows and columns;

storing a first row of the pixel blocks within a first memory bank, where a first pixel block of a first row is stored in a first storage location on a first page and all other pixel blocks in the first row are stored in the first page and subsequent pages in the first memory bank;

storing a second row of pixel blocks in a second memory bank, where a first pixel block of said second row is stored in a first storage location on a first page and all other pixel blocks in the second row are stored in the first page and subsequent pages in the second memory bank; and storing subsequent rows of pixels in an alternating manner in said first and second memory banks, where the first pixel block in each subsequent row of pixel blocks is stored in a first storage location of a page.

2. The method of claim 1 wherein said second memory bank is precharged while said first memory bank is being accessed and said first memory bank is precharged while said second memory bank is being accessed.

3. The method of claim 1 wherein pixel data within each of said pixel blocks are arranged into at least one data word.

* * * * *